United States Patent [19]

Postolaty et al.

[11] 4,001,672
[45] Jan. 4, 1977

[54] POLYPHASE AC POWER TRANSMISSION ARRANGEMENT WITH HOMOGENEOUS PHASES

[76] Inventors: Vitaly Mikhailovich Postolaty, ulitsa Demokraticheskaya, 6/1, kv. 58, Kishinev; Valentin Andreevich Venikov, ulitsa Novoslobodskaya, 67-69, kv. 62; Jury Nikolaevich Astakhov, ulitsa Gotvalda, 10-2, kv. 10, both of Moscow; Georgy Vladimirovich Chaly, bulvar Negrutsi, 5, kv. 12; Lev Pavlovich Kalinin, ulitsa Stefana Velikogo, 51a, kv. 35, both of Kishinev, all of U.S.S.R.

[22] Filed: Mar. 19, 1975

[21] Appl. No.: 559,876

[30] Foreign Application Priority Data

Mar. 21, 1974 U.S.S.R. .......................... 2006496

[52] U.S. Cl. .............................. 323/124; 174/147; 307/19; 307/147; 307/149
[51] Int. Cl.² .......................................... G05F 1/68
[58] Field of Search ........... 323/106, 120, 121–126; 307/19, 22, 33, 147, 149, 151, 93; 328/155; 174/27, 42

[56] References Cited

UNITED STATES PATENTS

| | | | |
|---|---|---|---|
| 1,896,399 | 2/1933 | Gay | 307/147 |
| 1,918,066 | 7/1933 | Tröger | 307/93 |
| 3,139,577 | 6/1964 | Krezek | 323/124 X |
| 3,290,510 | 12/1966 | Rose | 307/147 |
| 3,448,222 | 6/1969 | Greber | 174/27 |
| 3,450,983 | 6/1969 | Koppelmann et al. | 323/124 |
| 3,825,671 | 7/1974 | Pokorny | 174/42 |
| 3,829,736 | 8/1974 | Schirman | 323/106 X |

OTHER PUBLICATIONS

*Elect. News and Engnr.* July 1972, pp. 22–25.

*Primary Examiner*—Gerald Goldberg

[57] ABSTRACT

Disclosed is an alternating current transmission, comprising two lines wherein homogeneous phases of different lines are separated from each other by a minimum distance permissible for interphase overvoltages. Installed at the terminals of each of the lines are phase control units varying an angle of phase shift between the voltages of the drawn together phases of the lines. Arranged between homogeneous phases of the different lines, are capacitor banks whereas reactors are installed between the heterogeneous phases of the different lines. The electric current transmission is provided with braking resistors permitting to raise the stability of operation of the generators.

7 Claims, 7 Drawing Figures

4,001,672

POLYPHASE AC POWER TRANSMISSION ARRANGEMENT WITH HOMOGENEOUS PHASES

BACKGROUND OF THE INVENTION

The present invention relates to electric power transmissions and can be used for connecting the electric power systems as well as for supplying the electric power to consumers.

At present the problem of transmitting the constantly increasing amounts of power is solved by raising the operating voltage and by erecting additional transmission lines. However, the operating voltage has a natural limit whereas the air gap used as insulator loses its insulating roperties, making further increase of the voltage impossible. In addition the electric fields of high voltage exert a negative effect upon the environment. The erection of additional lines requires new ground areas for the transmission lines, thus complicating the problem.

This problem is solved to some extent by erecting double circuit electric power transmissions, thus laying two lines on a single pole.

However, in the known double-circuit electric power transmissions the reciprocal effect of the lines upon each other increases partial inductances and reduces partial capacitances of the conductors, thus raising characteristic impedance and decreasing the transmissive capacity of each phase. The partial capacitance is enhanced to some extent by splitting each phase to a number of conductors located in a circle. However, the known design of the phase does not use other possibilities to additionally increase the partial capacitance of the conductors, exerting a substantial effect upon the increase of the total transmissive capacity of the electric power transmission.

Also known in the art are electric power transmissions by insulated cables. The feature of the cable lines consists of a great value of the charging power which depends upon the length of the cable line. The range of the electric power transmission by cable lines is limited by a distance at which the charging current becomes equal to the maximum permissible heating current of the cable.

The flow of active power in electric current transmission lines can be varied within a wide range in the intensity as well as reverse its direction. As a result some counter-currents of reactive powers of one or the other sign appear in the line, exerting an effect upon the distribution of the voltage along the line and requiring a compensation.

At present electric power systems have faults due to breaking some phases, shortcircuiting the phases to each other or to ground and the like. Hence an asymmetry of voltages appears exerting a negative effect upon the operation of multiphase systems.

When the active power to be transmitted is reduced suddenly the rotors of the generators swing, voltage fluctuations appear, thus disturbing synchronization and stability of the systems to be connected.

It is an object of the present invention to increase transmissive capacity of electric power transmission and range of its control and, reduce the intensity of the electric field in the environment of the transmission lines.

It is another object of the present invention to provide a design of the splitted phase, thus permitting to increase the mutual capacitance of conductors.

It is a further object of the present invention to provide a novel method for controlling the transmissive capacity of electric power transmission as well as to reduce the asymmetry of voltages at one of the terminals when another terminal is damaged and to enhance the operation stability of the electric power systems to be connected.

It is still another object of the present invention to increase the critical length of the cable lines.

SUMMARY OF THE INVENTION

The objects of the present invention are attained by installing at the terminals of the electric power transmission, which comprises two three-phase lines, phase control units providing a phase shift between the voltages of different lines. Due to this, the transmissive capacity becomes a controllable value as well as reducing the distance between the conductors of homogeneous phases of different aerial lines, thus increasing the natural mutual capacitance of said phases. It is desirable to make each phase of both aerial lines in the form of a series of conductors associated with each other and located in the vertical plane, thus providing an additional increase of natural mutual capacitance of all the phases of the electric power transmission.

It is desirable to connect capacitor banks between the conductors of the homogeneous phases of different lines, thus increasing the full mutual capacitance of said phases of the electric power transmission; and to place reactors between the conductors of the heterogeneous phases of different lines, thus increasing the mutual inductance of said phases.

It is also highly desirable to place at the terminals controllable resistors connected via spark gaps shunted by circuit breakers, movable contacts of said circuit breakers are associated via an electromechanical transducer with the phase control unit installed at the terminal of the electric power transmission.

BRIEF DESCRIPTION OF THE DRAWINGS

The present invention will be better understood from the following detailed description of a preferred embodiment thereof with due reference to the accompanying drawings, wherein.

DESCRIPTION OF THE PREFERRED EMBODIMENTS

Figure 1:
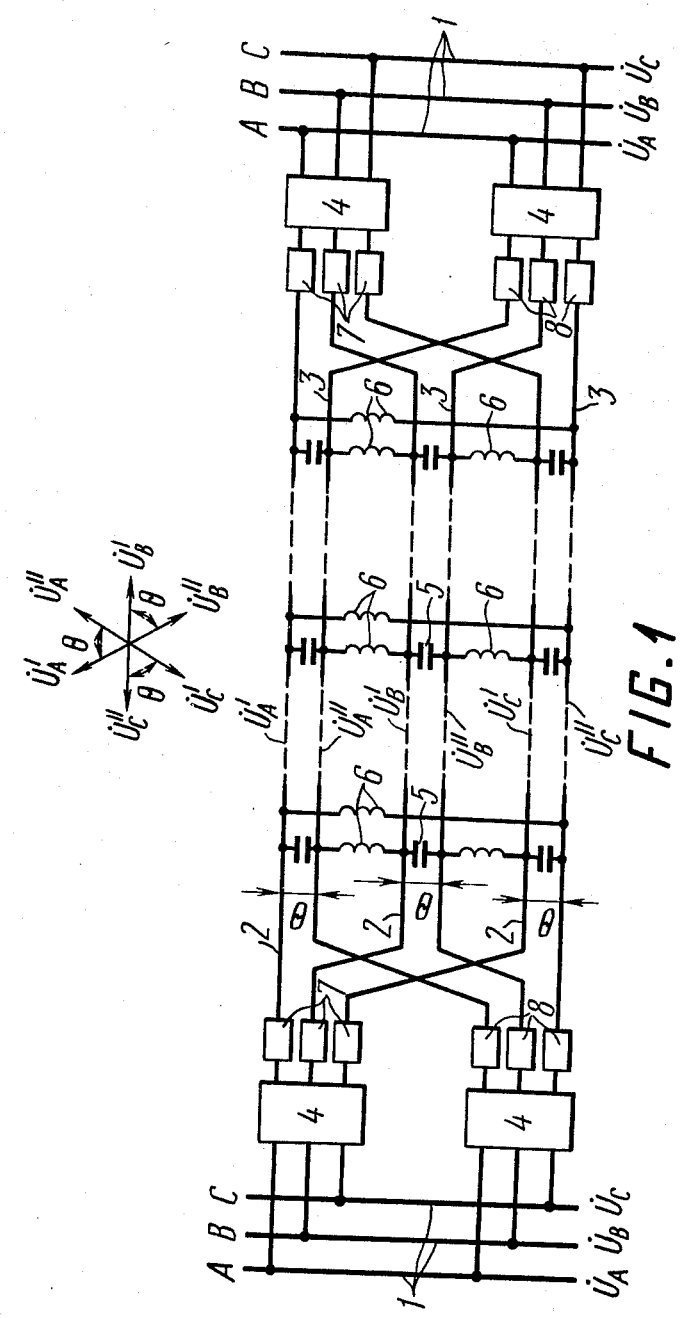
FIG. 1 shows the key diagram of the alternating current transmission according to the invention.

According to the key diagram of FIG. 1 the alternating current transmission connecting buses of two systems 1 comprises two three-phase lines 2 and 3, phase control units 4, capacitor banks 5, reactors 6 and circuit breakers 7 and 8.

The three-phase system of voltages ($V_A$, $V_B$, $V_C$) of buses 1 with the aid of the units 4 is converted into two three-phase systems of voltages ($V_A'$, $V_B'$, $V_C'$) and ($V_A''$, $V_B''$, $C_C''$) applied to conductors of lines 2 and 3 respectively. The phase shift ($\theta$) between the systems of voltages is controlled in a wide range.

As phase control units use can be made of special transformers for controlling the flow of the active power between the electric power systems (cf. Electric Machines and Apparatuses in Express Information of the All-Union Institute of Scientific and Technical Information No. 40, 1972) as well as other devices of continuous and discrete control of the phase shift.

Installed between the conductors of the homogeneous phases of different lines, whose voltages are ($V_A'$ and $V_A''$; $V_B'$ and $V_B''$; $V_C'$ and $V_C''$) respectively, are capacitor banks 5. Meanwhile the reactors 6 are placed between the heterogeneous phases of different lines whose voltages are ($V_A'$ and $V_C''$; $V_B'$ and $V_A''$; $V_C'$ and $V_B''$).

The transmission capacity of the electric power transmissions containing two lines is determined according to the following formula:

$$p = 2 \frac{V_1 V_2}{Z \sin(\alpha_o l)} \sin \delta, \quad (1)$$

wherein $V_1$ and $V_2$ define voltages at the sending and receiving ends of the electric power transmission respectively;

$\delta$ defines the angle between the voltages at the sending and receiving ends of the electric power transmission;

$Z$ defines characteristic impedance;

$l$ is the length of the line;

$\alpha_{o1}$ is the wave length of the line.

The characteristic impedance $Z$ is determined approximately with the following formula:

$$Z = \sqrt{\frac{L_1}{C_1}}, \quad (2)$$

wherein $L_1$ and $C_1$ are equivalent inductance and equivalent capacitance of the phases of the line.

When the load currents of both lines are equal parameters $L_1$ and $C_1$ in a generalized way can be determined as follows:

$$L_1 = L_2 + Me^{j\theta} \quad (3)$$

$$C_1 = C_2 - C_3 e^{j\theta} \quad (4)$$

$L_2$; $C_2$ are driving point components of equivalent inductance and equivalent capacitance due to geometrical dimensions of the phases and average geometrical distances between the phases of a single line.

$M$; $C_3$ are mutual components of equivalent inductance and equivalent capacitance due to magnetic and electric effect of the lines upon each other and due to the distance between the homogeneous phases of different lines.

Formulae (3) and (4) teach that when varying phase shift $\theta$ between the current of different lines of the electric power transmission, $L_1$ and $C_1$ are varied. Therefore, the characteristic impedance of the line is varied respectively, thus reaching the maximum when $\theta = 0$ and the minimum when $\theta = 180°$. To vary the phase shift between the three-phases systems of currents the phase shift between the three-phase systems of voltages ($V_A'$, $V_B'$, $V_C'$) and $V_A''$, $V_B''$, $V_C''$) of the different lines should be changed.

The transmissive capacity of the electric power transmission is varied according to the characteristic impedance variation.

Figure 2:
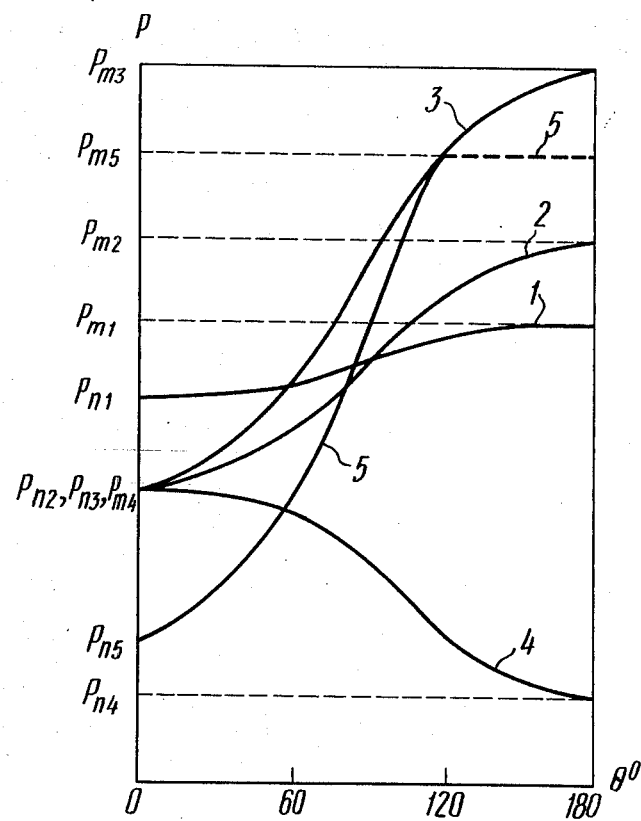
FIG. 2 shows the transmissive capacity curves as a function of an angle of the phase shift between the voltages of the homogeneous phases of the electric power transmission of FIG. 1.

Curve 1 in FIG. 2 illustrates the transmissive capacity of the electric power transmission as a function of angle $\theta$. Ordinates $P_{n1}$ and $P_{m1}$ are limiting values of the transmissive capacity when $\theta = 0$ and $\theta = 180°$ respectively. The difference of these values ($P_{m1} - P_{n1}$) is a control range of the transmissive capacity of the electric power transmission.

The reciprocal effect of the phases of different lines rises by approaching each other until the distance permissible for interphase overvoltages is minimum.

For the equivalent inductance the generalized formula (3) is transformed into:

$$L_1 = 2 \cdot 10^4 \left( \ln \frac{D_1}{r} + \ln \frac{D_2}{d} e^{j\theta} \right), \quad (5)$$

wherein $r$ stands for the equivalent radius of the phase;

$D_1$ defines the average geometrical distance between the phases of a single line;

$D_2$ defines an average geometrical distance between said phase of one line and two heterogeneous phases of another line;

$d$ stands for the distance between the homogeneous phases of different lines.

Formula (5) teaches that the less the distance $d$, the greater the second (mutual) component of the equivalent inductance. Therefore the mutual component of the equivalent capacitance is increased accordingly.

Curve 2 in FIG. 2 illustrates the transmissive capacity of the electric power transmission as a function of angle $\theta$ with the same conductors and distances $D_1$ used to plot curve 1 when distance $d$ is reduced. The comparison of curves 1 and 2 shows that $P_{n2} < P_{nl}$ when $P_{m2} > P_{m1}$, i.e. ($P_{m2} - P_{n2}) > (P_{m1} - P_{n1})$.

Thus, when distance $d$ decreases, both control range of the transmissive capacity and value of the transmissive capacity under the provision $\theta = 180°$ are raised.

Formula (5) teaches that the less the distance $D_1$, the less the driving point component of the equivalent inductance. Therefore the driving point component of the equivalent capacitance is enhanced.

When distance $D_1$ decreases, the value of the transmissive capacity $P_m$ under the provision $\theta = 180°$ rises; meanwhile the control range of the transmissive capacity ($P_m - P_n$) of the electric power transmission is reduced.

When installed between the homogeneous phases of different lines are capacitor banks 5 (FIG. 1), distributed along the length of the electric power transmission, both transmissive capacity $P_m$ providing $\theta = 180°$ and transmissive capacity control range $(P_m - P_n)$ are raised.

Curve 3 in FIG. 2 illustrates the transmissive capacity as a function of angle $\theta$ in the electric power transmission provided with capacitor banks installed between the homogeneous phases of different lines when these phases are separated by a minimum distance permissible for interphase overvoltages.

Therefore the capacitor banks 5, installed between conductors of the homogeneous phases of different lines of the electric power transmission enhance its sensitivity to the control of angle $\theta$, i.e. provide a gain effect.

Thus, formula (4) of the equivalent capacitance of the electric power transmission acquires the following view:

$$C_1 = C_2 - (C_3 + \Sigma C_4)e^{j\theta} \qquad (6)$$

wherein $\Sigma C_4$ stands for total capacitance of the installed capacitor banks.

Curve 4 in FIG. 2 illustrates the transmissive capacity as function of angle $\theta$ in the electric power transmission when reactors are installed between the homogeneous phases of different lines. In this case the transmissive capacity is reduced when increasing the phase shift.

Formula (3) of the equivalent inductance of the electric power transmission is now reduced to:

$$L_1 = L_2 + (M + \Sigma L_3)e^{j\theta} \qquad (7)$$

wherein $\Sigma L_3$ stands for total inductance of the installed reactors.

Reactors 6 in FIG. 1 are connected between the heterogeneous phases of different lines 2 and 3, thus providing a combined control of the transmissive capacity of the electric power transmission both by capacitors 5 and reactors 6.

When the phase shift between the three-phase systems of voltages $(V_A', V_B', V_C')$ and $(V_A'', V_B'', V_C'')$ is equal to zero, the voltage applied to capacitors 5 is equal to zero, meanwhile the voltage applied to reactors 6 is equal to the line voltage of the electric power transmission. Hence the reactive power stored in the electric field of the capacitors is equal to zero while the reactive power stored in the magnetic field of the reactors is equal to a value determined by the voltage applied to the reactors. Thus, when $\theta = 0$ the equivalent capacitance of the electric power transmission is equal to the natural capacitance while the equivalent inductance value is more than the natural inductance of the electric power transmission.

When increasing angle $\theta$, the equivalent capacitance is raised while the equivalent inductance is reduced. When $\theta = 120°$ the voltage applied to the capacitors banks 5 is equal to the line voltage while the voltage applied to the reactors is equal to zero. When $\theta = 120°$ the transmissive capacity of the electric power transmission is maximum. Curve 5 in FIG. 2 illustrates the transmissive capacity as a function of angle $\theta$ in the electric power transmission provided with capacitors 5 and reactors 6.

The concepts disclosed above permit coming to a general conclusion that the control of angle $\theta$ in conjunction with a minimum interval between the homogeneous phases of the electric power transmission and connection of additional capacitor banks 5 and reactors 6, as disclosed, permits to control the transmissive capacity of the electric power transmission within a wide range.

The phase control units having a wide range for controlling the angle of phase shift can be installed in one of the electric power transmission lines only, Hence all said features of the electric power transmission according to the invention still persist. The properties of the electric power transmission according to the invention persist even in the case when lines 2 and 3 (FIG. 1) operate in different levels of the voltage.

In some cases, such as for supplying the power to a large power consumer operating in a short-time reiteration mode of load it is desirable to apply a discrete control of the phase shift. In the case angle $\theta$ can be varied discretely both by phase control units and switching equipment.

Figure 3:
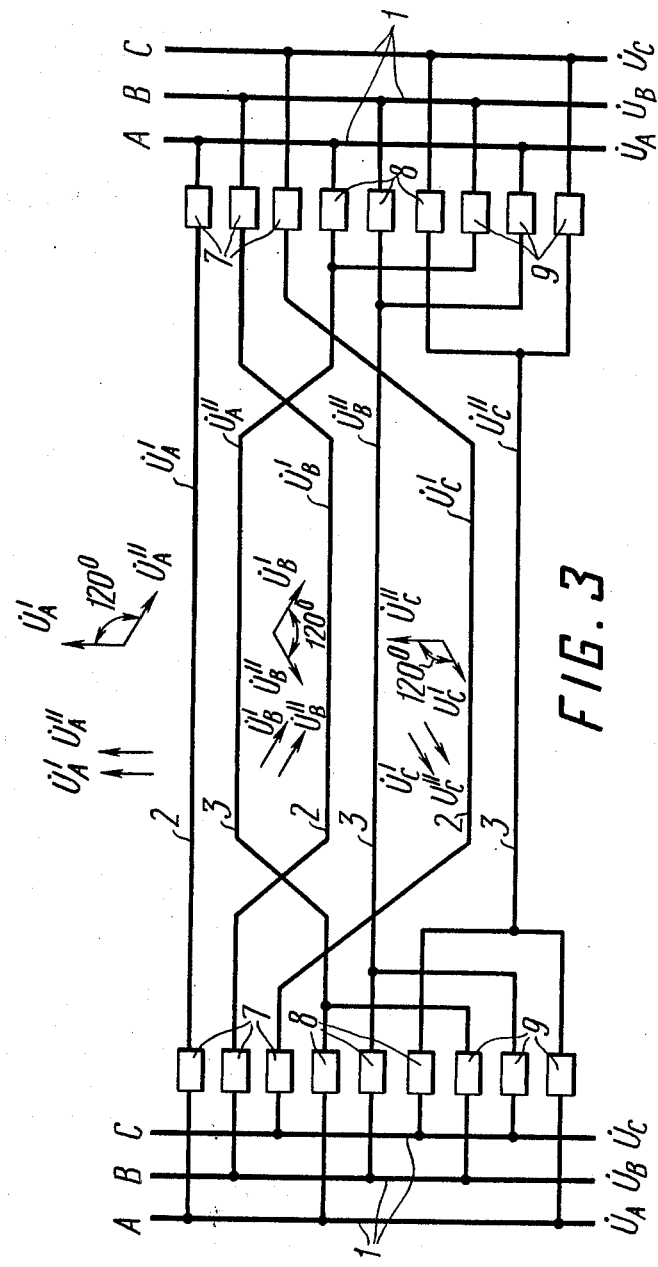
FIG. 3 shows the key diagram of the alternating current transmission, according to the invention, providing a discrete variation of the transmissive capacity.

FIG. 3 shows the key diagram of the alternating current transmission with a discrete variation of angle $\theta$, comprising lines 2 and 3 and switching arrangements 7, 8, 9 installed at the terminals of the electric power transmission.

Under no load conditions and at small loads at both terminals of the electric power transmission the switches 7 and 8 are on while the switch 9 is off. Hence the electric power transmission operates when the phase shift between the voltages of the phases with a minimum permissible separation is equal to zero and its transmissive capacity is minimum.

At full load the switches 8 are off meanwhile the switches 9 are on. In this case the electric power transmission operates when the phase shift between the voltages of the homogeneous phases of different lines is equal to 120° and its transmissive capacity rises to a value determined by angle $\theta = 120°$, i.e. approximately 1.2 to 1.5 times.

As described above, the known designs of the splitted phases do not use completely the opportunities for increasing the mutual capacitance of the conductors. However, the embodiment of the present invention permits raising the mutual capacitance of the phases compared with the known designs of the phases.

Figure 4:
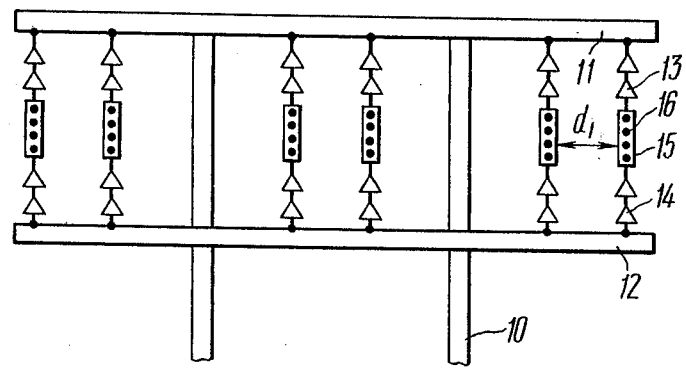
FIG. 4 shows the design of the splitted phase of the alternating current transmission according to the invention.

FIG. 4 illustrates a gantry pole 10 with two pole arms 11 and 12 between which the drawn together phases split into a number of conductors 16 located in the vertical plane are secured by supporting insulator chains 13 and stretching insulator chains 14 as well as by metal yokes 15.

In this case the conductors of the phases form plates of an air capacitor between which the electric field is concentrated. The mutual capacitance of the drawn together phases in the embodiment of the invention is a great deal higher than that of the known designs. In addition, the embodiment of the phase according to the invention provides a fixed distance $d_1$ on the pole.

In the length between the poles, the drawn together phases are fixed with insulation distance braces which can also be arranged between the heterogeneous phases of different lines.

The mandatory requirement for the best use of the mutual capacitance consists of the absence of the structure members of the pole between the phases separated by a minimum distance.

The distribution of the potentials at any point of the cross section of the electric power transmission according to the invention is determined with the following formula:

$$\phi_m = \frac{q_3}{2\pi\epsilon\epsilon_o} \ln \frac{b_{3m}}{a_{3m}} + \frac{q_4}{2\pi\epsilon\epsilon_o} \ln \frac{b_{4m}}{a_{4m}} \ldots + \frac{q_8}{2\pi\epsilon\epsilon_o} \ln \frac{b_{8m}}{d_{8m}} \quad (8)$$

wherein $\phi m$ stands for the potential at point $m$ in $kV$;

$q_i$ stands for the charge of conductor $i$ ($i = 3$ to $8$) determined for each phase as a capacitance multiplied by the voltage, i.e.

$$q_i = C_i V_i \ (i = 3 \text{ to } 8);$$

$d_{im}$ stands for the distance from conductor $i$ ($i = 3$ to $8$) to point $m$;

$b_{im}$ stands for the distance from a mirror image of conductor $i$ to point $m$;

$\epsilon\epsilon_o$ stands for the air dielectric permeability.

The potential difference of two points separated by a distance of 1 $m$ characterizes an intensity of the field in points located at this section (E in $kV/m$).

Intensity E in different points of the cross section plane of the electric power transmission according to the invention is calculated as a function of angle $\theta$. This function illustrates that when angle $\theta$ is varied from 0° to 180° the intensity of the electric field below the conductors decreases by a number of times.

When the voltage in a line having 12 steel aluminum conductors with a cross section of 300 mm² and horizontal suspension of the phases is 1,150 kV, the intensity of the field below the middle pair of conductors separated by a minimum distance near the pole at a height of 5 $m$ above the surface of the ground is reduced from 10 KV/$m$ when $\theta = 0$ to 1.5 kV/$m$ when $\theta = 180°$, i.e. more than by 6 times.

Figure 5:
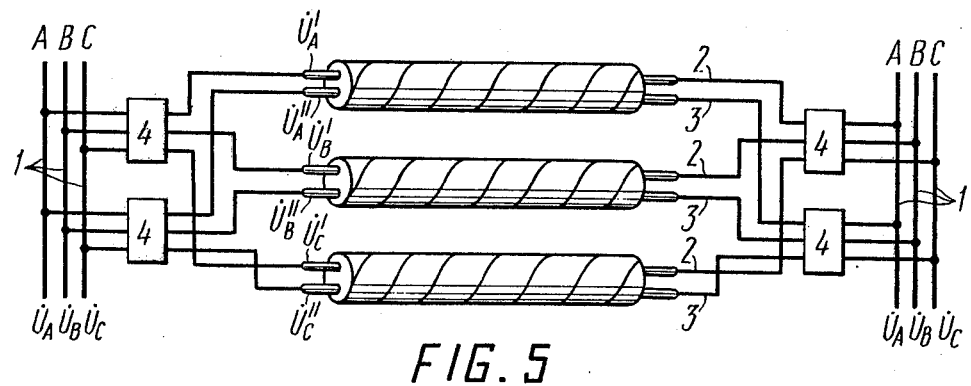
FIG. 5 shows the diagram of the alternating current transmission (cable embodiment) according to the invention.

FIG. 5 shows a cable embodiment of the electric power transmission according to the invention.

Lines 2 and 3 are connected between buses 1 of the systems to be connected via phase control units 4. The conductors of homogeneous phases of the different lines are located in a single separated sheathing.

Phase control units 4 transform the system of voltages ($V_A$, $V_B$, $V_C$) into two systems of voltages ($V_A'$, $V_B'$, $V_C'$) and ($V_A''$, $V_B''$, $V_C''$) applied to different lines and adjust the phase shift $\theta$ therebetween.

The permissible length of the alternating current cable lines is characterized with a critical length (1) at which the charging current of the cable under no load conditions of the line is equal to the limiting current of loads. Current and respective charging power are called critical. For the known cable lines of industrial frequency the critical length does not exceed 40–80 km. For compensating the reactive power of the long alternating current cable lines powerful compensators are to be installed.

The electric power transmission in a cable embodiment according to the invention provides an adjustment of the charging power in a wide range from the maximum to lower values. Further in the text, in comparison of the lines according to the invention with those known in the art, the maximum charging power of the cable line according to the invention is assumed to be equal to the charging power of the known cable line.

The critical length of the cable line is increased by many times by adjusting the charging power whereas the great transmissive capacity persists. This feature permits to increase the possible length of cable lines, thus enhancing their applications. In addition, the control of the charging power of the cable line permits to reduce the required power of the units installed for compensating the excess of the reactive power, thus increasing the economic factor of the cable lines.

The charging power of the cable line per one strand is calculated according to the following formula:

$$Q = V^2 \omega c l \quad (9)$$

wherein $V$ stands for the voltage applied to the cable strand;

$\omega$ is an angular frequency;

$c$ stands for the equivalent capacitance of the cable strand per unit length;

$l$ stands for the length of the cable line.

When values $V$ and $\omega$ are constant, the charging power of the line can be varied by adjusting equivalent capacitance C which depends upon a cable design and phase shift between the voltages applied to the cables strands.

Thus, for a two-strand cable with an external diameter of 180 mm, radius of strands being 20 mm, distance between the strands being 70 mm, the operating capacitance, when $\theta = 180°$, relates to the capacitance, when $\theta = 0$, as 1:0.26. The operating capacitance of the cable determined actually its critical length. Therefore said relation of the capacitances also determines a ratio of the critical length of the cable line, according to the invention, to the critical length of the known line, this ratio being equal to 3.8.

Thus, the electric power transmission disclosed permits to increase the critical length of the cable line up to 150 to 300 km. Therefore, the alternating current power can be transmitted at a comparatively great distance. The electric power transmission cable line according to the invention requires the capacity of the compensating units 3.8 times less than those used in the known cable line of the same length.

When one of the systems to be connected is at fault and thus an asymmetry of voltages appear, the latter can be reduced at the other terminal of the electric power transmission by using the special circuit arrangement of the switching equipment.

Figure 6:
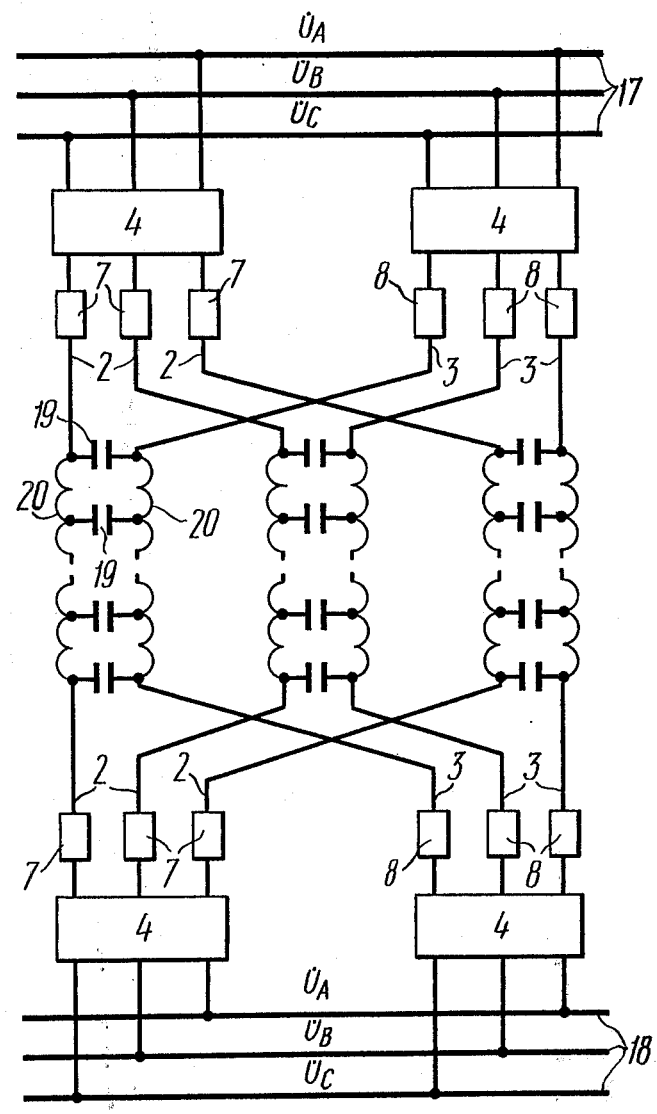
FIG. 6 shows the diagram of the alternating current transmission operating in a mode of direct and negative sequence filter, according to the invention.

FIG. 6 shows the key diagram of the alternating current transmission according to the invention, disclosing the described concepts.

The alternating current transmission comprising two lines 2 and 3, phase control units 4 and switching arrangements circuit breakers 7 and 8 connects two power systems 17 and 18.

Lines 2 and 3 are shown in the form of the natural distributed mutual capacitances 19 and equivalent inductances 20.

When an asymmetry of voltages appears for example in the system 17, one of the switching 7 or 8 is cut off near the buses of system 18 and when an asymmetry of voltages appears in the system 18 one of the switches 7 or 8 is cut off near the buses of system 17.

Thus, the switches of both lines are off at the terminal of the electric power transmission connected to the damaged system while one switch is off at the terminal of the electric power transmission connected to the system operating in the normal duty. Hence a line opened at one end serves as a balancing resistor. The value of the braking balancing resistor is varied within a wide range by adjusting the phase shift $\theta$.

The phase control unit installed at the electric power transmission terminal connected to the sound system matches the phase shift of the electric power transmission voltages with those of the respective system.

Figure 7:
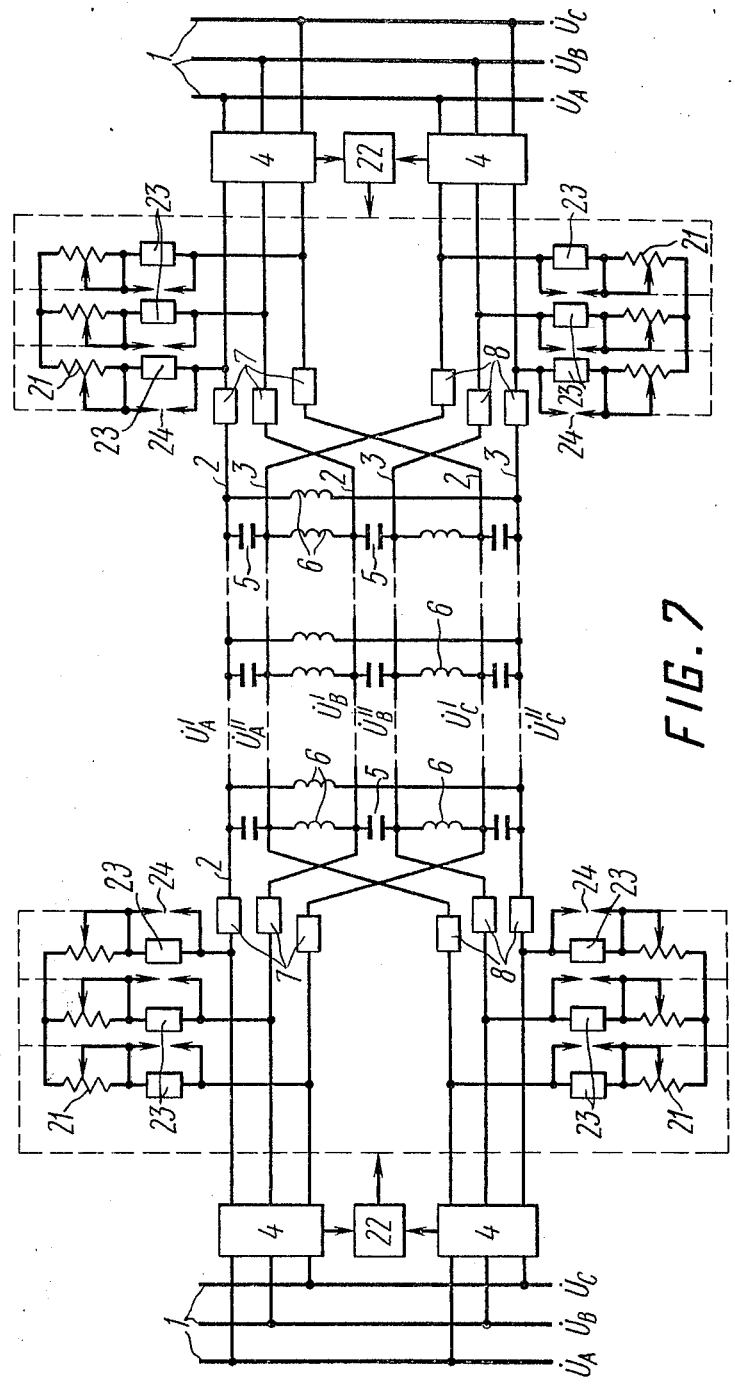
FIG. 7 shows an embodiment of the electric power transmission with braking resistors, according to the invention.

FIG. 7 shows the key diagram of the alternating current transmission, according to the invention, with braking resistors 21, electro-mechanical transducer 22, resistors switches 23 and discharge units 24 at the terminals.

The electric power transmission operates as follows. When the loaded line (or both lines) is cut off suddenly at one or both terminals, a spark gap (or spark gaps) of the respective discharges 24 is disrupted. The spark gap is then shunted with its switch 23, and as a result corresponding load resistor 21, equal to the characteristic impedance of the line, is cut in practically instantly to the buses 1 of the corresponding substation instead of the cut-off line. The value of resistor 21 is adjusted according to the duty and is always equal to the characteristic impedance of the line. The value of load resistor 21 is adjusted by the electro-mechanical transducer 22 connected between two phase control units 4 according to the duty of the electric power transmission. As an electro-mechanical transducer 22 use can be made of any known device converting the electric value (voltage or phase shift) into mechanical motion.

The braking resistors connected therein when the line is suddenly cut off enhance the stability of operation of the generators.

Thus, the alternating current transmission according to the invention provides the enhanced transmissive capacity, reduced ecologic effect of the lines, reduces the asymmetry of voltages, raises the stability of operation of the power systems and has properties which permit to use it as a control element carrying out an objective purposeful effect upon the process of the power transmission and its distribution.

What we claim is:

1. An alternating current power transmission arrangement, comprising at least two polyphase lines with homogeneous phases, said homogeneous phases having conductors separated by a minimum distance permissible for interphase overvoltages, phase control units at terminals of electric power transmission, the voltages of said homogeneous phases being shifted relative to each other to an angle differing from zero by said phase control units at the terminals of electric power transmission, said power transmission being controlled as a function of the power transmitted by a control system, the phase shift control improving the efficiency, duty and technical-economical parameters of the electric power transmission.

2. An electric power transmission arrangement as claimed in claim 1, including systems to be connected, each phase of said lines being connected to the homogeneous phases of systems to be connected, switching means, each phase of another line being connected to both homogeneous phases and to those followed in alternating of respective systems through said switching means and providing the respective shift between the voltages of the homogeneous phases of different lines.

3. An electric power transmission as claimed in claim 1, capacitor banks connected between the homogeneous phases of said lines, and reactors connected between the heterogeneous phases of the different lines for enlarging the control range of the transmissive capacity.

4. An electric power transmission as claimed in claim 1, wherein each phase of said lines comprises a plurality of conductors located in the vertical plane, two insulator chains, said plurality of conductors being fixed between said two insulator chains, and a gantry pole with crossbars, said insulator chains being fastened to different crossbars of the gantry pole for increasing the electric capacity of the phases and the transmissive capacity of the electric power transmission.

5. An electric power transmission as claimed in claim 4, wherein homogeneous phases of the different lines are located at one side of the pole for providing the minimum distances permissible for interphase overvoltages between lines of drawntogether phases.

6. An electric power transmission as claimed in claim 1, including terminals on each of said lines, dischargers shunted with contacts of switches, adjustable load resistors connected to said terminals through said dischargers, an electromechanical transducer, said load resistors having movable contacts and being associated with respective phase control units through said transducer for raising the dynamic stability of the electric power transmission.

7. An electric power transmission as claimed in claim 1, including a common sheathing, the homogeneous phases of different lines being located in said common sheathing.

* * * * *